United States Patent
Seto et al.

(10) Patent No.: US 6,339,740 B1
(45) Date of Patent: Jan. 15, 2002

(54) ADAPTIVE VEHICLE SPEED CONTROL SYSTEM

(75) Inventors: Youji Seto, Kanagawa; Hideaki Inoue; Yosuke Kobayashi, both of Yokohama, all of (JP)

(73) Assignee: Nissan Motor Co. Ltd., Yokohama (JP)

(*) Notice: Subject to any disclaimer, the term of this patent is extended or adjusted under 35 U.S.C. 154(b) by 0 days.

(21) Appl. No.: 09/629,798

(22) Filed: Jul. 31, 2000

(30) Foreign Application Priority Data

Jul. 30, 1999 (JP) .......................................... 11-216689

(51) Int. Cl.$^7$ ................................................ B60Q 1/00
(52) U.S. Cl. ............................. 701/96; 701/97; 701/98; 340/904
(58) Field of Search ............................. 701/93, 95, 96, 701/97, 98, 300, 301; 180/170, 179; 340/901, 902, 903, 904; 342/70, 71, 455

(56) References Cited

U.S. PATENT DOCUMENTS

| 5,234,071 | A | * | 8/1993 | Kajiwara | ..................... 180/169 |
| 5,850,176 | A | * | 12/1998 | Kinoshita et al. | ........... 340/435 |
| 6,154,168 | A | * | 11/2000 | Egawa et al. | .................. 342/71 |
| 6,185,499 | B1 | * | 2/2001 | Kinoshita et al. | ............. 701/96 |
| 6,188,950 | B1 | * | 2/2001 | Tsutsumi et al. | ............. 701/96 |

FOREIGN PATENT DOCUMENTS

JP          8-192662          7/1996

* cited by examiner

Primary Examiner—William A. Cuchlinsk, Jr.
Assistant Examiner—Marthe Y. Marc-Coleman
(74) Attorney, Agent, or Firm—Foley & Lardner (57) ABSTRACT

An adaptive vehicle speed control system includes a vehicle speed sensor detecting a vehicle speed of a host vehicle which is subjected to adaptive vehicle speed control including preceding vehicle following control and vehicle speed control, and an inter-vehicle distance sensor detecting an inter-vehicle distance between the host vehicle and a preceding vehicle. A man-machine interface is provided for setting a set vehicle speed. Also provided is an adaptive vehicle speed controller which includes a desired inter-vehicle distance arithmetic-processing section calculating a desired inter-vehicle distance based on at least the host vehicle speed, a following control section determining a desired speed of the host vehicle based on the host vehicle speed and the inter-vehicle distance so that the inter-vehicle distance is brought closer to the desired inter-vehicle distance in presence of detection of the preceding vehicle, and a vehicle-speed adjustment device which adjusts the host vehicle speed to the desired speed. The adaptive vehicle speed controller includes a vehicle speed setting section which sets the desired speed to a speed value higher than a low-speed threshold value when the adaptive vehicle speed control function is engaged under a specified condition where the host vehicle speed is below the low-speed threshold value.

10 Claims, 5 Drawing Sheets

ADAPTIVE VEHICLE SPEED CONTROL SYSTEM

BACKGROUND OF THE INVENTION

1. Field of the Invention

The present invention relates to an adaptive vehicle speed control system capable of performing a so-called "following control" function according to which a host vehicle can follow a preceding vehicle, while maintaining the host vehicle's distance from the preceding vehicle at a desired preset inter-vehicle distance, and specifically to the improvement of an automatic speed-control technology containing a following control function as well as a constant-speed control function.

2. Description of the Prior Art

In recent years, there have been proposed and developed various automatic speed-control technologies. An adaptive vehicle speed control system, capable of executing a following control function and a constant-speed control function, has been disclosed in Japanese Patent Provisional Publication No. 8-192662. The adaptive vehicle speed control system disclosed in the Japanese Patent Provisional Publication No. 8-192662 includes an operation switch serving as a man-machine interface and outputting a start command signal needed to initiate the following control function and constant-speed control function, and an electronic control unit (ECU) equipped with a processor. The processor includes a first vehicle speed setting section and a second vehicle speed setting section. The first vehicle speed setting section sets, during a constant-speed control mode, a set vehicle speed at a vehicle road speed the vehicle was traveling at when the start command signal was output. And the second vehicle speed setting section sets, during a following control mode, a set vehicle speed at a predetermined value higher than the vehicle road speed the vehicle was traveling at when the start command signal was output.

SUMMARY OF THE INVENTION

However, the adaptive vehicle speed control system as disclosed in the Japanese Patent Provisional Publication No. 8-192662, has the following drawback.

For instance, when a start command signal for initiation of the constant-speed control mode is output under a particular condition where the vehicle slows down owing to the braking action and then is still running at an excessively low speed but not yet stopped, the set vehicle speed may be set to such an excessively low speed. Thereafter, the brakes tend to apply automatically each time the limiting action of the vehicle speed to the excessively low speed (determined as the set vehicle speed) occurs. As can be appreciated, owing to the set vehicle speed set to such an excessively low speed, there is an increased tendency for the braking action to undesiredly continue so as to maintain the set vehicle speed at the excessively low speed, and thus the driver/vehicle occupants may feel uncomfortable.

Accordingly, it is an object of the invention to provide an adaptive vehicle speed control system, which avoids the aforementioned disadvantages of the prior art.

It is another object of the invention to provide an adaptive vehicle speed control system capable of avoiding a vehicle-speed limiting action based on undesirable braking action, even when an adaptive vehicle speed control is engaged during vehicle driving at an excessively low speed less than a predetermined low-speed threshold value. order to accomplish the aforementioned and other objects of the present invention, an adaptive vehicle speed control system comprises a vehicle speed detection device which detects a host vehicle speed of a host vehicle which is subjected to adaptive vehicle speed control including preceding vehicle following control and vehicle speed control, an inter-vehicle distance detection device which detects an inter-vehicle distance between the host vehicle and a preceding vehicle ahead of the host vehicle, a set-vehicle-speed setting device having a man-machine interface for setting a set vehicle speed, a vehicle speed controller comprising a desired inter-vehicle distance arithmetic-processing section calculating a desired inter-vehicle distance based on at least the host vehicle speed, a following control section determining a desired speed of the host vehicle based on the host vehicle speed and the inter-vehicle distance so that the inter-vehicle distance is brought closer to the desired inter-vehicle distance in presence of detection of the preceding vehicle, and a vehicle-speed adjustment device which adjusts the host vehicle speed to the desired speed determined by the vehicle speed controller, and an adaptive-vehicle-speed-control initiation command device which outputs a command signal indicative of initiation of the adaptive vehicle speed control including the following control performed through the following control section and the vehicle speed control performed through the vehicle speed control section, wherein the vehicle speed controller includes a vehicle speed setting section which sets the desired speed determined by the vehicle speed controller to a speed value higher than a low-speed threshold value, in presence of output of the command signal under a specified condition where the host vehicle speed is below the low-speed threshold value.

According to a further aspect of the invention, an adaptive vehicle speed control method, which comprises detecting a vehicle speed of a host vehicle which is subjected to adaptive vehicle speed control including preceding vehicle following control and vehicle speed control, detecting an inter-vehicle distance between the host vehicle and a preceding vehicle ahead of the host vehicle, setting a set vehicle speed through a man-machine interface, calculating a desired inter-vehicle distance based on at least the host vehicle speed, determining a desired speed of the host vehicle based on the host vehicle speed and the inter-vehicle distance so that the inter-vehicle distance is brought closer to the desired inter-vehicle distance in presence of detection of the preceding vehicle, adjusting the host vehicle speed to the desired speed, outputting a command signal indicative of initiation of the adaptive vehicle speed control including the following control and the vehicle speed control, and setting the desired speed to a speed value higher than a low-speed threshold value, in presence of output of the command signal under a specified condition where the host vehicle speed is below the low-speed threshold value.

DESCRIPTION OF THE PREFERRED EMBODIMENTS

Figure 1:
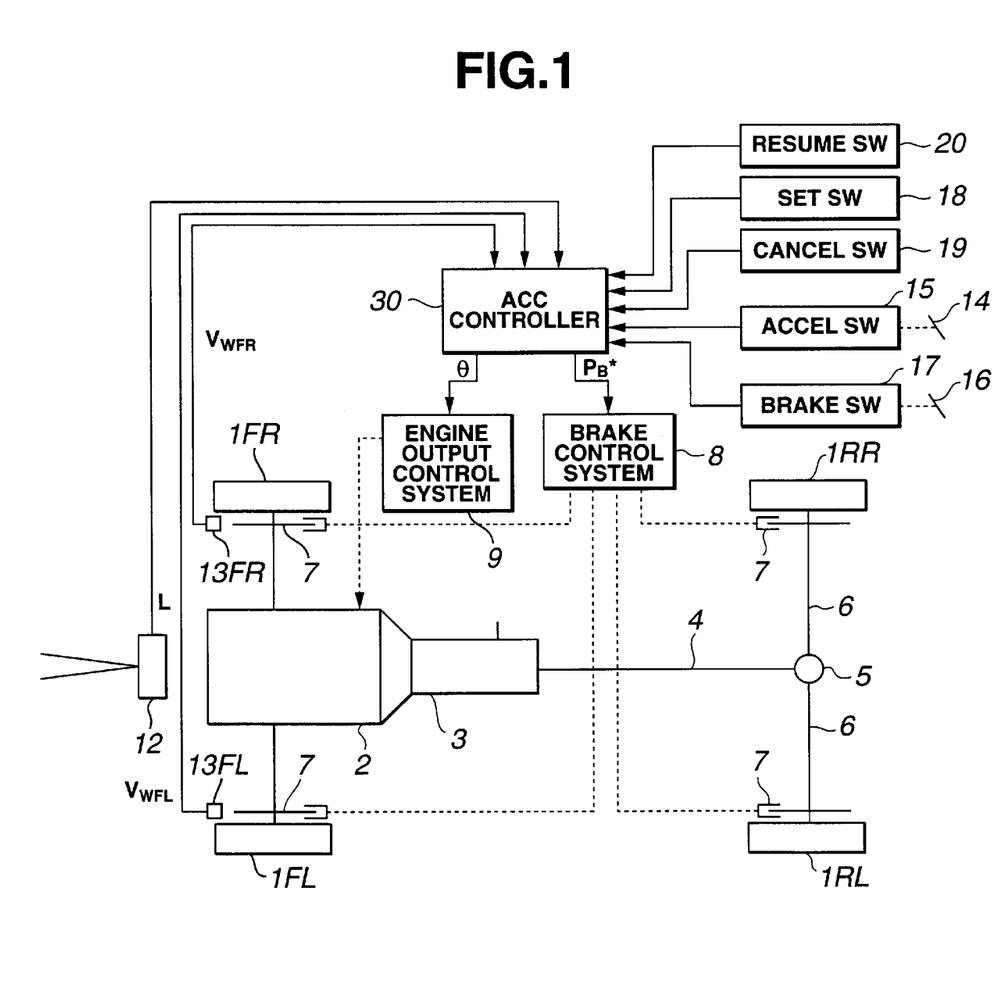
FIG. 1 is a system diagram illustrating a system arrangement of one embodiment of an adaptive vehicle speed control system of the invention.

Referring now to the drawings, particularly to FIG. 1, the adaptive vehicle speed control system of the invention is exemplified in a rear-wheel drive vehicle having front-left and front-right driven wheels 1FL and 1FR and rear-left and rear-right drive wheels 1RL and 1RR. Engine power output (engine torque) is transmitted from an internal combustion engine 2 through an automatic transmission 3, a propeller shaft 4, and a final reduction gear 5, and via axle drive shafts (6, 6) to the drive wheels (1RL, 1RR). The automatic transmission is a typical automatic transmission which permits a creeping travel of the vehicle without depression of an accelerator in a low vehicle speed range. Disk brakes (7, 7, 7, 7) are provided at the respective road wheels (1FL, 1FR, 1RL, 1RR) to provide braking action. Hydraulic brake pressure of the individual wheel-brake cylinders respectively associated with the disk brakes is regulated or controlled by means of a brake control system 8. Brake control system 8 is designed to produce a braking pressure based on the magnitude of depression of a brake pedal 16, and also to produce a braking pressure based on a command signal which is output by an adaptive vehicle speed control ECU or an adaptive cruise control controller (ACC controller) 30 and is indicative of a desired braking pressure. An engine output control system 9 is provided at engine 2 for controlling engine output or engine torque. There are at least two ways to control engine output. One way is to adjust a throttle opening of a throttle valve so as to control a rotational speed of engine 2. The other way is to adjust an opening of an idle control valve so as to control an idle speed of engine 2. In the shown embodiment, the engine output control system 9 uses the former way, that is, the throttle-opening adjustment. An inter-vehicle distance sensor 12 (serving as an inter-vehicle distance detection means) is mounted on the lower part of the front end of a host vehicle, which is subjected to adaptive vehicle speed control (adaptive cruise control), to capture, recognize, sense or detect the preceding vehicle (relevant target vehicle) and to monitor the separating between the host vehicle and the preceding vehicle. In the system of the embodiment, a scanning laser radar sensor is used as the inter-vehicle distance sensor. As is generally known, the scanning laser radar sensor includes a scanning device, containing both a transmitter and a receiver. The scanning device of the laser radar sensor transmits a pulse of light (laser beam) in a horizontal line, back and forth. The scanning device measures the time of flight of the pulse of light, and then the inter-vehicle distance is calculated on the basis of the time interval from the transmitted pulse (the time when the laser beam is emitted from the host vehicle) to the received pulse (the time when the receiver receives the laser wave reflected from the preceding vehicle). Adaptive vehicle speed control ECU 30 (ACC controller) generally comprises a microcomputer. The ACC controller includes an input/output interface (I/O), memories (RAM, ROM), and a microprocessor or a central processing unit (CPU). The input/output interface (I/O) of ACC controller 30 receives input information from of various engine/vehicle switches and sensors, namely front-left and front-right wheel-speed sensors 13FL, 13FR, an accelerator switch 15, a brake switch 17, a set switch 18, a cancel switch 19, and a resume switch 20. Front-left and front-right wheel-speed sensors 13FL and 13FR are located at the respective front road wheels 1FL and 1FR, to sense front-left and front-right wheel speeds $V_{WFL}$ and $V_{WFR}$. Accelerator switch 15 is located near an accelerator pedal 14 to detect depression of accelerator pedal 14. Brake switch 17 is located near the brake pedal 16 to detect depression of brake pedal 16. Set switch 18 is one of the three operation switches (18, 19, 20) functioning as a man-machine interface. Set switch 18 serves as a speed-decreasing switch needed to decrease the set vehicle speed and is also provided to initiate or engage the adaptive vehicle speed control (containing the following control function). Cancel switch 19 is provided to disengage or cancel the adaptive vehicle speed control function. Resume switch 20 serves as a speed-increasing switch needed to increase the set vehicle speed and is also provided to read out the set vehicle speed stored just before disengagement or cancellation of the adaptive vehicle speed control, and to resume the stored vehicle speed. Within the ACC controller, the central processing unit (CPU) allows the access by the I/O interface of input informational data signals from the previously-discussed engine/vehicle switches and sensors 13FL, 13FR, 15, 17, 18, 19, and 20. The CPU of ACC controller 30 is responsible for carrying the engine-output-control/brake-control program stored in memories and is capable of performing necessary arithmetic and logic operations containing an adaptive vehicle-speed-control management processing (containing an electronic engine output control achieved through engine output control system 9 as well as an active brake control achieved through brake control system 8) shown in FIG. 2. Computational results (arithmetic calculation results), that is, calculated output signals (solenoid drive currents) are relayed via the output interface circuitry of the ACC controller to output stages, namely a throttle valve actuator included in the engine output control system 9 and electromagnetic solenoids constructing part of a hydraulic modulator included in brake control system 8. The adaptive vehicle-speed-control management processing is executed as a main program by the CPU of ACC controller 30.

Figure 2:
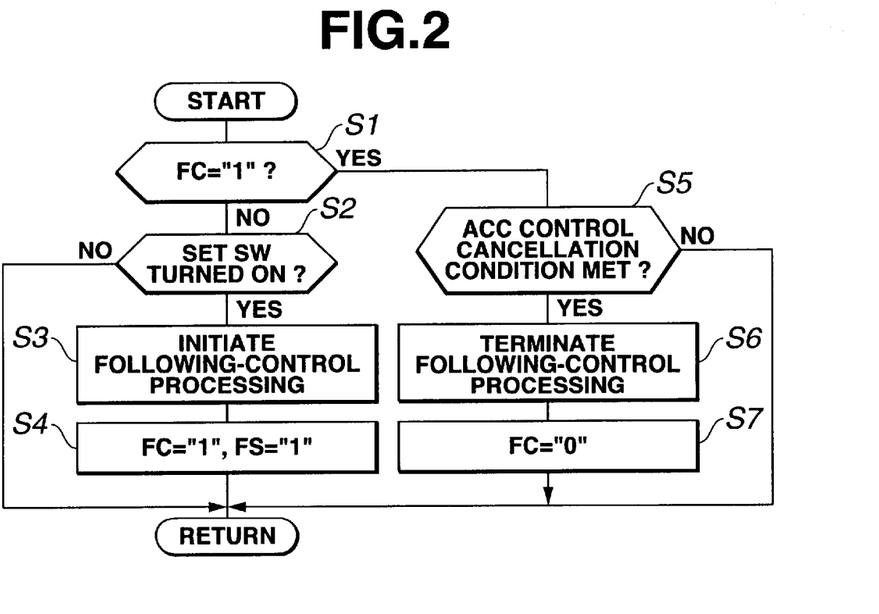
FIG. 2 is a flow chart illustrating an adaptive vehicle-speed-control management processing (a main program), executed by an ACC controller or an adaptive vehicle speed control ECU incorporated in the system of the embodiment.

At step S1, a check is made to determine whether an adaptive vehicle-speed-control indicative flag FC is set (=1) or reset (=0). The flag FC=1 means that the system is in the adaptive vehicle speed control mode. In other words, the flag FC=1 means engagement for the adaptive vehicle speed control. On the other hand, the flag FC=0 means disengagement for the adaptive vehicle speed control. When the answer to step S1 is in the negative (NO), that is, FC=0, the system is out of the adaptive vehicle speed control, step S2 occurs. At step s2, a check is made to determine whether the set switch 18 is turned on or off. When the answer to step S2 is negative (NO), that is, the set switch is turned off, ACC controller 30 determines that there is no requirement for the adaptive vehicle speed control. Then, the program is returned from step S2 to step S1. Conversely, when the answer to step S2 is affirmative (YES), that is, the set switch is turned on, the program proceeds to step S3. At step S3, the system initiates the adaptive vehicle-speed-control subroutine (or the following-control processing) shown in FIG. 3. Thereafter, at step S4, the adaptive vehicle-speed-control indicative flag FC is set at "1", and at the same time an adaptive vehicle-speed-control initiation indicative flag FS is set at "1". For this reason, flag FS=1 means a starting period of the adaptive vehicle speed control. On the other hand, when the answer to step S1 is in the affirmative (YES), i.e., in case of FC=1, the program flows from step S1 to step S5. At step S5, a test is made to determine whether a predetermined adaptive vehicle-speed-control cancellation condition (simply, an ACC control cancellation condition) is met. The ACC control cancellation condition corresponds to either of a first condition where cancel switch 19 is turned on, a second condition where accelerator switch 15 is turned on, and a third condition where brake switch 17 is turned on. When the ACC control cancellation condition is unsatisfied, the program is returned to step S1. When the ACC control cancellation condition is satisfied, the program flows from step S5 to step S6. At step S6, the system terminates the adaptive vehicle-speed-control operating mode (or the following-control processing shown in FIG. 3). Then, step S7 occurs. At step S7, the adaptive vehicle-speed-control indicative flag FC is reset to "1". After steps S4 or S7, the program is returned to step S1.

Figure 3:
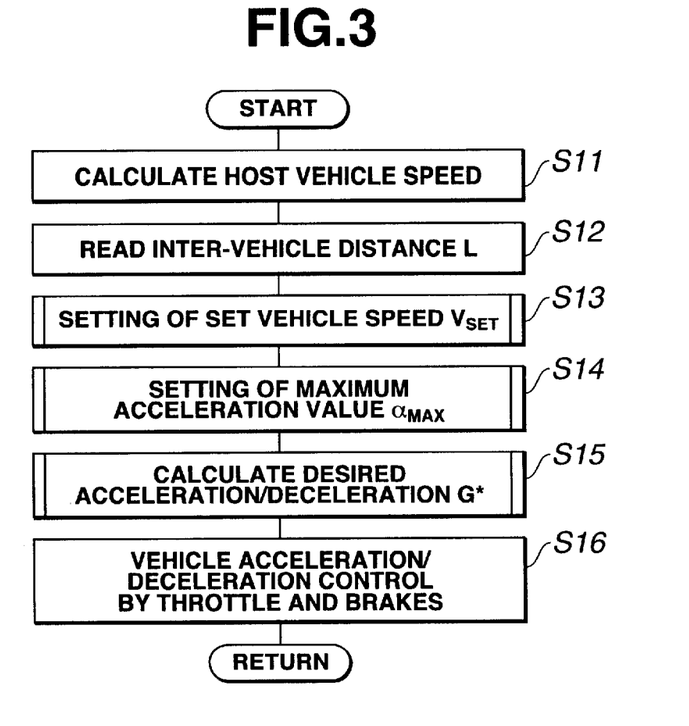
FIG. 3 is a flow chart illustrating a following-control subroutine or an adaptive vehicle-speed-control subroutine related to steps S3 and S6 of FIG. 2.

Referring now to FIG. 3, there is shown the adaptive vehicle-speed-control subroutine (the following-control processing) related to steps S3 or S6 of FIG. 2. The sub-routine shown in FIG. 3 is executed as time-triggered interrupt routines to be triggered every predetermined time intervals such as 10 msec.

At step S11, first of all, the number of pulses of the pulse signal from each of the wheel-speed sensors 13FL and 13FR is counted or the pulse width of the pulse signal from each wheel speed sensor (13FL, 13FR) is measured. On the basis of the result of measurement of the pulse width or the number of pulses counted and the circumferential length of a tire of each of the front road wheels (1FL, 1FR), the CPU of ACC controller 30 is able to calculate or determine both a vehicle speed based on front-left wheel speed $V_{WFL}$ and a vehicle speed based on front-right wheel speed $V_{WFR}$. Then, an average value of these vehicle speeds is calculated and determined as a host vehicle speed Vs of the host vehicle. At step S12, the inter-vehicle distance L between the host vehicle and the preceding vehicle (the relevant target vehicle), detected by the inter-vehicle distance sensor 12, is read. At step S13 of FIG. 3, the system executes the set-vehicle-speed ($V_{SET}$) setting subroutine shown in FIG. 4. Thereafter, the routine proceeds from step S13 to step S14. At step S14 of FIG. 3, the system executes maximum acceleration ($\alpha_{MAX}$) setting subroutine shown in FIG. 5. At step S15 of FIG. 3, the system executes the desired acceleration/deceleration (G*) arithmetic calculation routine shown in FIG. 6. Then, at step S16 of FIG. 3, in order to adjust host vehicle speed Vs and to achieve an adaptive vehicle speed control (an ACC control), the system executes the active engine output control and active brake control (active vehicle acceleration/deceleration control) based on desired acceleration/deceleration value G* calculated at step S15, by way of the throttle valve operated by engine output control system 9 and the brakes operated by brake control system 8. After step S16 of FIG. 3, the main program of FIG. 2 returns.

Figure 4:
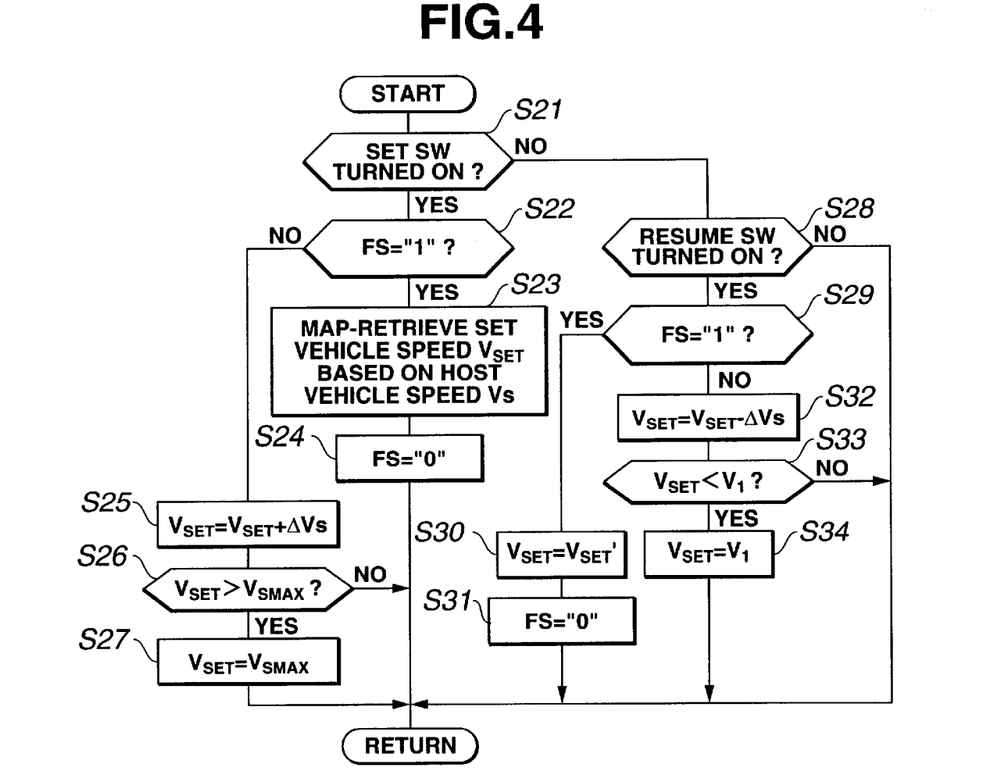
FIG. 4 is a flow chart illustrating a set-vehicle-speed ($V_{SET}$) setting subroutine related to step S13 of FIG. 3.

Referring now to FIG. 4, there is shown the set-vehicle-speed ($V_{SET}$) setting subroutine.

At step S21, a check is made to determine whether set switch 18 is turned on. When the answer to step S21 is in the affirmative (YES), that is, set switch 18 is turned on, step S22 occurs. At step S22, a check is made to determine whether adaptive vehicle-speed-control initiation indicative flag FS is set. When flag FS is set at "1", the ACC controller 30 determines that this time corresponds to the starting period of the adaptive vehicle speed control, and then the routine proceeds to step S23. At step S23, set vehicle speed $V_{SET}$ is map-retrieved on the basis of host vehicle speed Vs from a predetermined or preprogrammed host-vehicle speed versus set-vehicle-speed characteristic map showing how set vehicle speed $V_{SET}$ varies relative to host vehicle speed Vs. Thereafter, step S24 occurs. At step S24, adaptive vehicle-speed-control initiation indicative flag FS is reset to "0". In the preprogrammed Vs–$V_{SET}$ characteristic map shown in FIG. 7, a speed value denoted by $V_1$ is a low-speed threshold value preset at a predetermined value higher than the maximum speed value of a creep speed (given during creeping travel of the host vehicle) occurring owing to a creep phenomenon of the automatic transmission 3. That is, when host vehicle speed Vs is above the low-speed threshold value $V_1$, it is possible to maintain set vehicle speed $V_{SET}$ without producing any braking force. As can be appreciated from the characteristic map shown in FIG. 7, when the host vehicle speed Vs is below the low-speed threshold value $V_1$, set vehicle speed $V_{SET}$ is fixed to or maintained at low-speed threshold value $V_1$. When the host vehicle speed Vs is greater than low-speed threshold value $V_1$, set vehicle speed $V_{SET}$ increases in direct-proportion to an increase in host vehicle speed Vs. When the answer to step S22 is negative (NO), step S25 occurs. At step S25, a sum ($V_{SET}+\Delta s$), obtained by adding a predetermined value $\Delta Vs$ to the current value of set vehicle speed $V_{SET}$, is set as a new set vehicle speed $V_{SET}$. Then, step S26 occurs. At step S26, a test is made to determine whether set vehicle speed $V_{SET}$ exceeds an upper limit $V_{SMAX}$ of set vehicle speed. In case of $V_{SET}>V_{SMAX}$, the routine proceeds from step S26 to step S27. At step S27, set vehicle speed $V_{SET}$ is limited to upper limit $V_{SMAX}$. Conversely, when the answer to step S26 is negative (NO), that is, in case of $V_{SET} \leq V_{SMAX}$, the set-vehicle-speed ($V_{SET}$) setting subroutine terminates. On the other hand, when the answer to step S21 is negative (NO), that is, set switch 18 is turned off, the routine proceeds from step S21 to step S28. At step S28, a check is made to determine whether resume switch 20 is turned on. When the answer to step S28 is negative (NO), that is, resume switch 20 is turned off, the set-vehicle-speed ($V_{SET}$) setting subroutine terminates. Conversely, when the answer to step S28 is affirmative (YES), that is, resume switch 20 is turned on, step S29 occurs. At step S29, a check is made to determine whether the adaptive vehicle-speed-control initiation indicative flag is set. In case of FS=1, the routine flows from step S29 to step S30. At step S30, a set vehicle speed $V_{SET}'$ set just before cancellation of the adaptive vehicle speed control is set as set vehicle speed $V_{SET}$. Then, at step S31, adaptive vehicle-speed-control initiation indicative flag FS is reset to "0". Returning to step S29, when adaptive vehicle-speed-control initiation indicative flag FS is reset to "0", step S32 occurs. At step S32, the difference ($V_{SET}-\Delta Vs$), obtained by subtracting predetermined value $\Delta Vs$ to the current value of set vehicle speed $V_{SET}$, is set as a new set vehicle speed $V_{SET}$. Thereafter, at step S33, a test is made to determine whether set vehicle speed $V_{SET}$ is less than predetermined low-speed threshold value $V_1$. In case of $V_{SET} \geq V_1$, the routine ends. Conversely, in case of $V_{SET}<V_1$, the routine proceeds from step S33 to step S34. At step S34, predetepredetermined low-speed threshold value $V_1$, is set as set vehicle speed $V_{SET}$. In this manner, one cycle of the routine terminates.

Figure 5:
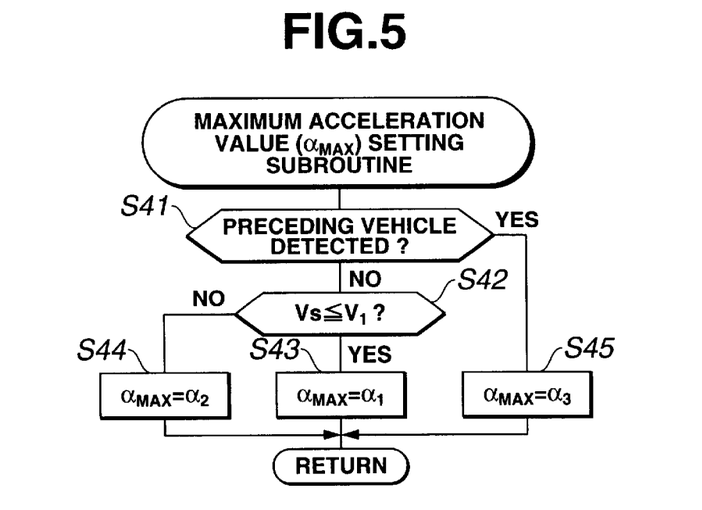
FIG. 5 is a flow chart illustrating a maximum acceleration value ($\alpha_{MAX}$) setting subroutine related to step S14 of FIG. 3.

Referring now to FIG. 5, there is shown maximum acceleration value ($\alpha_{MAX}$) setting subroutine.

At step S41, a check is made to determine whether inter-vehicle distance sensor 12 captures or detects the preceding vehicle (the relevant target vehicle). When the answer to step S41 is negative (NO), that is, the inter-vehicle distance sensor 12 does not capture the preceding vehicle, step S42 occurs. At step S42, a check is made to determine whether the host vehicle speed Vs is below the predetermined low-speed threshold value $V_1$. In case of $Vs \leq V_1$, the routine proceeds from step S42 to step S43. At step S43, maximum acceleration value $\alpha_{MAX}$ is set at a first set value $\alpha_1$ (a comparatively small acceleration value). Conversely, in case of $Vs > V_1$, the routine proceeds from step S42 to step S44. At step S44, the maximum acceleration value $\alpha_{MAX}$ is set at a second set value $\alpha_2$ (greater than first set value $\alpha_1$). Returning to step S41, when the inter-vehicle distance sensor 12 captures or detects the preceding vehicle, the routine flows from step S41 to step S45. At step S45, maximum acceleration value $\alpha_{MAX}$ is set at a third set value $\alpha_3$ (greater than second set value $\alpha_2$).

Figure 6:
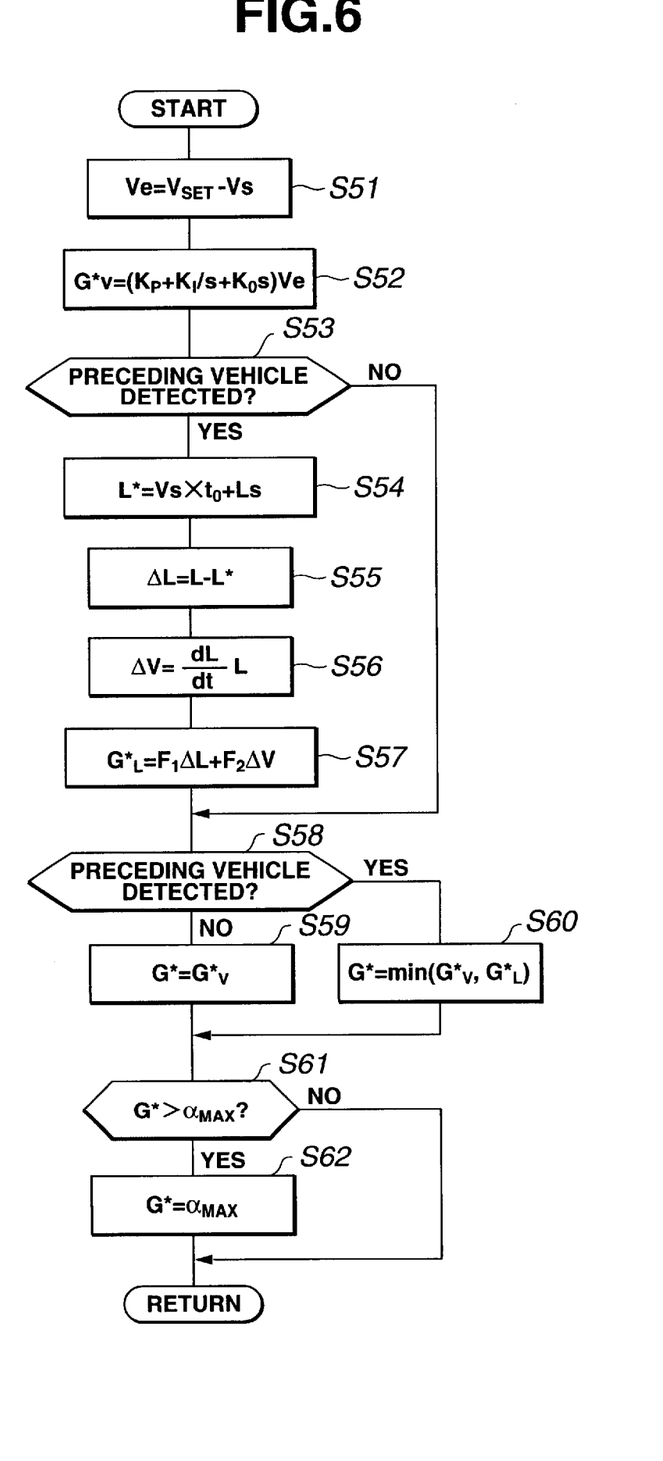
FIG. 6 is a flow chart illustrating a desired acceleration/deceleration (G*) arithmetic calculation routine related to step S15 of FIG. 3.

Referring now to FIG. 6, there is shown the desired acceleration-and-deceleration (G*) arithmetic calculation routine.

At step S51, first of all, a vehicle speed deviation Ve is arithmetically calculated by subtracting the host vehicle speed Vs from set vehicle speed $V_{SET}$. That is, the speed deviation Ve is represented as expression Ve=$V_{SET}$−Vs. Thereafter, in order to perform vehicle-speed feedback control, at step S52, a desired acceleration/deceleration $G^*_V$ used for vehicle speed control (mainly in absence of preceding vehicle detection) is arithmetically calculated from the following expression (1).

$$G^*_V = (K_P + K_I/S + K_D \cdot S) Ve \quad (1)$$

where s denotes a Laplace variable, $K_P$, $K_I$, and $K_D$ respectively denote a proportional gain, an integral gain, and a derivative gain, and Ve is the speed deviation calculated at step S51.

Then, at step S53, a check is made to determine whether the inter-vehicle distance sensor 12 captures or detects the preceding vehicle (the relevant target vehicle). If the inter-vehicle distance sensor 12 does not detect the preceding vehicle, the routine jumps from step S53 to step S58 which will be fully described later. When the inter-vehicle distance sensor 12 detects the preceding vehicle, the routine proceeds from step S53 to step S54. At step S54, a desired inter-vehicle distance L* is arithmetically calculated from the following expression (2).

$$L^* = Vs \times t_O + L_S \quad (2)$$

where to denotes a time-to-reaching to predetermined inter-vehicle-distance $L_O$ (simply, a time gap) defined as a time elapsed to the time when the separating distance between the preceding vehicle and the host vehicle following behind the preceding vehicle reaches the predetermined inter-vehicle distance $L_O$, and $L_S$ denotes an offset value from a vehicle in front, required when the host vehicle is stopped.

Thereafter, at step S55, an inter-vehicle distance deviation ΔL is arithmetically calculated by subtracting desired inter-vehicle distance L* (calculated at step S54) from the inter-vehicle distance L detected by inter-vehicle distance sensor 12. That is, the distance deviation ΔL is represented by the expression ΔL=L−L*. Then, at step S56, a relative speed ΔV of the preceding vehicle with respect to the host vehicle is computed by differentiating the detected inter-vehicle distance L by way of a band-pass filtering process or a high-pass filtering process, and then defined as (dL/dt)L. After this, at step S57, another desired acceleration/deceleration $G^*_L$ used for inter-vehicle distance control or following control (in presence of preceding vehicle detection) is arithmetically calculated from the following expression (3).

$$G^*_L = F_1 \Delta L + F_2 \Delta V \quad (3)$$

where $F_1$ and $F_2$ are coefficients, ΔL denotes inter-vehicle distance deviation (ΔL=L−L*), and ΔV denotes relative speed (ΔV=(dL/dt)·L) of the preceding vehicle to the host vehicle.

Then, the routine proceeds from step S57 to step S58. In the same manner as step S53, at step S58 a check is made to determine whether inter-vehicle distance sensor 12 captures or detects the preceding vehicle (the relevant target vehicle). When inter-vehicle distance sensor 12 does not detect the preceding vehicle, the routine flows from step S58 to step S59. At step S59, desired acceleration/deceleration $G^*_V$ used for vehicle speed control and calculated through step S52, is set as a desired acceleration/deceleration G*, and then the routine advances to step S61 (described later). Returning to step S58, when inter-vehicle distance sensor 12 detects the preceding vehicle, the routine proceeds from step S58 to step S60. At step S60, the lowest one of the desired acceleration/deceleration $G^*_V$ calculated at step S52 and desired acceleration/deceleration $G^*_L$ calculated at step S57 is set as the desired acceleration/deceleration by way of a so-called select-LOW process. Thereafter, the routine shifts to step S61. At step S61, a test is made to determine whether desired acceleration/deceleration G* selected through steps S59 or S60 is greater than the maximum acceleration value $\alpha_{MAX}$. In case of $G^* > \alpha_{MAX}$, step S62 occurs. At step S62, maximum acceleration value $\alpha_{MAX}$ is set as desired acceleration/deceleration G*. Returning to step S61, when desired acceleration/deceleration G* is below the maximum acceleration value ($G^* \leq \alpha_{MAX}$), the program exits the routine.

The adaptive vehicle speed control system operates as follows.

Suppose that the adaptive vehicle speed control is disengaged or released, that is to say, adaptive vehicle-speed-control indicative flag FC is reset, and additionally the host vehicle is now stopped and separated from the preceding vehicle predetermined offset value $L_S$. Under such a specified condition, when the system executes the adaptive vehicle-speed-control management processing of FIG. 2 with set switch 18 turned off, the program proceeds from step S1 to step S2, and thus ends not via steps S3 or S6. In this case, the system does not execute the adaptive vehicle-speed-control subroutine (or the following-control subroutine) shown in FIG. 3 and related to steps S3 and S6. In other words, as long as the set switch is turned off, the adaptive vehicle-speed-control function is continuously disengaged or released. Under this condition, when set switch 18 is shifted to an ON state, the program proceeds from step S2 to step S3, and thus the adaptive vehicle-speed-control subroutine initiates. Subsequently to step S3, at step S4 adaptive vehicle-speed-control indicative flag FC is set at "1", and simultaneously adaptive vehicle-speed-control initiation indicative flag FS is set at "1". In this manner, the adaptive vehicle-speed-control routine initiates. Upon initiation of the adaptive vehicle-speed-control routine, the host vehicle speed Vs is calculated through step S11 of FIG. 3, and then the host vehicle's distance L from the preceding vehicle, detected by sensor 12, is read out (see step S12). Thereafter, the set-vehicle-speed ($V_{SET}$) setting subroutine shown in FIG. 4 is executed (see step S13). At this time, set switch 18 remains turned on, and thus the routine of FIG. 4 proceeds from step S21 to step S22, and then flows to step S23, because of FS=1. At step S23, set vehicle speed $V_{SET}$ is determined or map-retrieved based on host vehicle speed Vs from the preprogrammed host-vehicle speed versus set-vehicle-speed characteristic map shown in FIG. 7. At this time, the host vehicle is still stopped and thus the host vehicle speed Vs is zero. By map-retrieval from the characteristic map of FIG. 7, the low-speed threshold value $V_1$ is set as the set vehicle speed $V_{SET}$, because of Vs(=0)<$V_1$. After this, at step S24, the adaptive vehicle-speed-control initiation indicative flag FS is reset to "0". In this manner, after set vehicle speed $V_{SET}$ has been set or determined, the routine proceeds from step S13 to step S14. In order to set maximum acceleration value $\alpha_{MAX}$, the system executes maximum acceleration value ($\alpha_{MAX}$) setting subroutine shown in FIG. 5. The preceding vehicle has already been recognized, captured or detected by inter-vehicle distance sensor 12, and thus the routine flows from step S41 to step S45. At step S45, the maximum acceleration value $\alpha_{MAX}$ is set at the third set value $\alpha_3(>\alpha_2>\alpha_1)$ (see the uppermost horizontal line shown in FIG. 8). After the setting operation of maximum acceleration value $\alpha_{MAX}$ has been completed, the routine advances to step S15 of FIG. 3. At step S15, desired acceleration-and-deceleration (G*) arithmetic calculation processing of FIG. 6 is executed. Vehicle speed deviation Ve is calculated through step S51 of FIG. 6. In this case, speed deviation Ve (=$V_{SET}$-Vs) becomes equal to set vehicle speed $V_{SET}$, because of Vs=0. Actually, desired acceleration/deceleration $G^*_v$ is calculated based on the speed deviation Ve (=$V_{SET}$ in case of Vs=0) from the previously-described expression (1), and as a result desired acceleration/deceleration $G^*_v$ for vehicle speed control becomes a positive value (see step S52 of FIG. 6). Then, the routine proceeds from step S52 via step S53 to step S54, since inter-vehicle distance sensor 12 continues to detect or recognize the preceding vehicle. As previously discussed, the host vehicle speed Vs is still kept at "0", and thus desired inter-vehicle distance L* becomes the offset value $L_S$ through step S54. On the other hand, the actual inter-vehicle distance L is $L_S$. Thus, inter-vehicle distance deviation $\Delta L$ (=L-L*=$L_S$-$L_S$) becomes zero (see step S55). As a result, the relative speed $\Delta V$ (=(dL/dt)·L) of the host vehicle to the preceding vehicle becomes "0" (see step S56). The desired acceleration/deceleration $G^*_L$ for inter-vehicle distance control becomes "0" (see step S57), because of $\Delta L$=0 and $\Delta V$=0. At this time, the preceding vehicle is continuously detected by sensor 12, and thus the routine proceeds from step S57 via step S58 to step S60. Through step S60, the lowest one (that is, $G^*_L$=0) of two desired acceleration/deceleration values $G^*_v$(=positive value) and $G^*_L$(=0) calculated is selected and set as desired acceleration/deceleration G*. In this case, desired acceleration/deceleration G* (=0) is less than the maximum acceleration value $\Delta_{MAX}(=\alpha_3)$. Therefore, this value $G^*_L$ (=0) is finally set as desired acceleration/deceleration G*. After the setting of desired acceleration/deceleration G* of step S15 has been completed, the routine proceeds to step S16 of FIG. 3. Through step S16, throttle opening θ of the throttle valve is set at "0", that is, the throttle valve is adjusted to its fully-closed position, due to desired acceleration/deceleration G* set at "0". At this time, the host vehicle is still in the stopped state and the system is executing an automatic stop mode. Thus, until the automatic stop mode is released, a command signal representative of a predetermined target braking pressure $P_B$* is continuously output to the hydraulic modulator included in brake control system 8, in order to maintain a braking condition (or a stopped state of the vehicle).

Under these conditions, when the preceding vehicle starts, the actual host vehicle's distance L from the preceding vehicle begins to increase. On the other hand, the host vehicle remains stopped, that is, the host vehicle speed Vs remains kept at "0", and thus desired inter-vehicle distance L* is still maintained at the offset value $L_S$(see FIG. 54). Owing to the actual inter-vehicle distance L gradually increasing and desired inter-vehicle distance L* kept at the offset value $L_S$, distance deviation $\Delta L$ begins to increase (see step S55). Due to the actual inter-vehicle distance L gradually increasing, relative speed $\Delta V$ of the preceding vehicle to the host vehicle also increases (see step S56). Due to two variables $\Delta L$ and $\Delta V$ both increasing, desired acceleration/deceleration $G^*_L$ for inter-vehicle distance control also begins to increase in the positive direction. For the reasons set forth above, the system operating mode is switched from the automatic stop mode to the following control mode, and then desired braking pressure $P_B$* is set at "0", whereas throttle opening θ is increased and thus engine output (engine torque) is also increased to accelerate the host vehicle. As a consequence, the host vehicle starts while following the preceding vehicle. That is, when the host vehicle, being in the stopped state, begins to follow the preceding vehicle with relevant target vehicle detection, maximum acceleration value $\alpha_{MAX}$ is set at the third set value $\alpha_3$ (the highest one of the three different set values $\alpha_1$, $\alpha_2$, and $\alpha_3$) (see the uppermost horizontal line of FIG. 8), so as to allow the host vehicle to be accelerated at a high acceleration rate suitable for the acceleration rate of the preceding vehicle. This provides the improved acceleration performance and insures a smooth comfortable acceleration of the vehicle without giving the driver uncomfortable feel. In addition to the above, during early stages of the following control mode just after shifted from the automatic stop mode, low-speed threshold value $V_1$ is set as set vehicle speed $V_{SET}$. As discussed above, low-speed threshold value $V_1$ is predetermined as a vehicle speed value that can maintain a set vehicle speed $V_{SET}$ with no assistance of a braking force. In other words, the system can maintain set vehicle speed $V_{SET}$ through only the adaptive vehicle-speed-control system actuated vehicle acceleration, but not through the adaptive vehicle-speed-control system actuated vehicle deceleration. After this, as soon as host vehicle speed Vs reaches set vehicle speed $V_{SET}$, host vehicle speed Vs is kept at set vehicle speed $V_{SET}$. With host vehicle speed Vs kept at set vehicle speed $V_{SET}$, when the driver newly switches the set switch 18 on, the routine proceeds from step S22 to step S25, since adaptive vehicle-speed-control initiation indicative flag FS is reset to "0" through set vehicle speed $V_{SET}$ setting subroutine shown in FIG. 4. As a result, the current set vehicle speed $V_{SET}$ is incremented by he predetermined speed value $\Delta$ Vs at one control cycle. Therefore, if the driver continues the ON state of the set switch 18, set vehicle speed $V_{SET}$ can be increased responsively to a time duration during which the set switch is continuously turned on. Then, as soon as set vehicle speed $V_{SET}$ reaches upper speed limit $V_{SMAX}$, set vehicle speed $V_{SET}$ is limited to upper limit $V_{SMAX}$ (see step S27 of FIG. 4). In this manner, as set vehicle speed $V_{SET}$ increases, the host vehicle speed Vs also increases in a manner such that the host vehicle satisfactorily follows the preceding vehicle.

Under these conditions, in order to reduce set vehicle speed $V_{SET}$, the driver switches resume switch 20 on. As soon as resume switch 20 is switched on, in the set-vehicle-speed setting subroutine shown in FIG. 4, the routine proceeds from step S21 via step S28 to step S29, and then advances to step S32, since adaptive vehicle-speed-control initiation indicative flag FS has already been reset. Thereafter, the current set vehicle speed $V_{SET}$ is decremented by predetermined speed value $\Delta Vs$ at one control cycle. Thus, if the driver continues the ON state of resume switch 20, set vehicle speed $V_{SET}$ can be decreased responsively to a time duration during which the resume switch is continuously switched on. Then, as soon as set vehicle speed $V_{SET}$ becomes less than the predetermined low-speed threshold value $V_1$, set vehicle speed $V_{SET}$ is limited to low-speed threshold value $V_1$ (see the flow from step S33 to step S34 of FIG. 4). Furthermore, according to the program of the adaptive vehicle speed control system of the embodiment, the system operating mode is quickly shifted to the previously-described following control mode, even in case that set switch 18 is turned on under a specified condition where inter-vehicle distance sensor 12 detects the preceding vehicle and the host vehicle is running at an excessively low-speed just after starting. Exactly speaking, low-speed threshold value $V_1$ is set as set vehicle speed $V_{SET}$, and maximum acceleration value $\Delta_{MAX}$ is set at the third set value $\alpha_3$. Therefore, it is possible to accelerate the host vehicle at an adequate acceleration rate (corresponding to the third set value $\alpha_3$) without providing a conventional operating mode in which the set vehicle speed is maintained at a vehicle road speed the vehicle was traveling at when the set switch was turned on, that is, the adaptive vehicle-speed-control function engagement command signal was output. Therefore, even when the set switch is turned on under a specified condition where inter-vehicle distance sensor 12 detects the preceding vehicle and the host vehicle is running at an excessively low speed just after starting, it is possible to maintain set vehicle speed $V_{SET}$ through only the adaptive vehicle-speed-control system actuated vehicle acceleration without adaptive vehicle-speed-control system actuated vehicle deceleration.

Moreover, suppose the preceding vehicle (the relevant target vehicle) decelerates and stops for a red traffic light (a stoplight) under a specified condition where the host vehicle follows the preceding vehicle with preceding vehicle detection. According to a series of steps of desired acceleration/deceleration (G*) arithmetic calculation processing shown in FIG. 6, desired acceleration/deceleration value G* is set at a negative value. That is, the desired deceleration rate for the host vehicle is calculated through the arithmetic processing of FIG. 6. A command signal representative of desired braking pressure $P_B^*$ based on the desired deceleration rate calculated, is output to the hydraulic modulator of the brake control system 8, to actuate each of the disk brakes in response to the command signal. As a result, the host vehicle is properly decelerated, and then stopped. In order to maintain desired braking pressure $P_B^*$, the system maintains the automatic stop mode as long as the preceding vehicle is stopped.

On the other hand, when set switch 18 is turned on under a specified condition where the operating condition of the host vehicle is transferred to the stopped state or to the low-speed running state with no relevant target vehicle detection, set vehicle speed $V_{SET}$ is set at the low-speed threshold value $V_1$. At this time, if the host vehicle speed Vs is less than low-speed threshold value $V_1$, maximum acceleration value $\alpha_3$ is set to the first set value $\alpha_1$, corresponding to the lowest one of three different set values $\alpha_1, \alpha_2,$ and $\alpha_3$ (see the flow from step S41 via step S42 to step S43 in the flow chart shown in FIG. 5). In this case, in the arithmetic calculation processing of FIG. 6, speed deviation Ve ($=V_{SET}-Vs$) may become a relatively large value (see step S51) and desired acceleration/deceleration $G^*_V$ for vehicle speed control may also become a positive large value (see step S52). Positive large value $G^*_V$ is set as desired acceleration/deceleration value G* (see the flow from step S52 through steps S53 and S58 to step S59). However, maximum acceleration value $\alpha_{MAX}$ is set the lowest set value $\alpha_1$, and as a result of this the desired acceleration/deceleration G* is limited to the first set value $\alpha_1$, (see the flow from step S61 to step S62 and simultaneously see the lower most acceleration limiting horizontal line ($\alpha_1$) of FIG. 8 with no relevant target detection). As discussed above, when set switch 18 is turned on after shifting to the stopped state or to the low-speed running state with no relevant target vehicle detection, a command signal indicative of a throttle opening $\theta$ based on desired acceleration/deceleration value G* (limited to the first set value $\alpha_1$), is output to the throttle actuator incorporated in engine output control system 9. This ensures a comparatively moderate accelerating state of the host vehicle. Accordingly, the host vehicle is moderately accelerated due to acceleration value G* limited to first set value $\alpha_1$, until the host vehicle speed Vs reaches low-speed threshold value $V_1$ (set as set vehicle speed $V_{SET}$). At this time, if the driver switches the set switch 18 on, and thus set vehicle speed $V_{SET}$ is increased up to a speed value greater than low-speed threshold value $V_1$, maximum acceleration value $\alpha_{MAX}$ is set at the second set value $\alpha_2$ (the second highest set value) greater than the first set value $\alpha_1$, (see the flow from step S41 via step S42 to step S44 and simultaneously see intermediate acceleration limiting horizontal line ($\alpha_2$) of FIG. 8 with no relevant target detection). Responsively to the driver's wishes (driver-operated set switch 18), the host vehicle can be accelerated in a manner such that host vehicle speed Vs is brought closer to a new set vehicle speed $V_{SET}$ at a middle acceleration rate based on the second set value $\alpha_2$.

The previously-discussed adaptive vehicle speed control function is turned off, when the ACC control cancellation condition is met. During adaptive vehicle speed control, suppose the host vehicle is following the preceding vehicle with preceding vehicle detection, or running at a constant-speed running mode in such a manner as to maintain a set vehicle speed $V_{SET}$ with no preceding vehicle detection, or stopped in the automatic stop mode. Under such a condition, when accelerator pedal 14 is depressed by the driver and thus accelerator switch 15 is switched on, or when brake pedal 16 is depressed by the driver and thus brake switch 17 is switched on, or when the driver switches cancel switch 19 on, the adaptive vehicle speed control function is deactivated or disengaged. As set out above, if the ACC control cancellation condition is met, in the adaptive vehicle-speed-control management processing of FIG. 2, the program proceeds from step S1 through step S5 to step S6 so as to suspend the adaptive vehicle speed control subroutine (the following-control subroutine) shown in FIG. 3 and consequently to deactivate or disengage the adaptive vehicle speed control function, and then advances to step S7 so as to reset adaptive vehicle-speed-control indicative flag FC. Reactivation of the adaptive vehicle speed control function is only possible when the driver switches the set switch 18 on again. With the adaptive vehicle speed control system disengaged, the host vehicle is accelerated or decelerated by operating the accelerator pedal 14 or the brake pedal 16 by the driver.

As will be appreciated from the above, according to the system of the embodiment, when the set switch is turned on with the host vehicle in a stopped state or in a running state at a low road vehicle speed, and thus the adaptive vehicle speed control function is initiated or engaged, set vehicle speed $V_{SET}$ is set at the previously-noted low-speed threshold value $V_1$, that can maintain the set adaptive vehicle speed control speed with no assistance of a braking force, but not at a vehicle road speed the host vehicle was traveling at when the set switch was turned on. For instance, when the host vehicle is creeping due to traffic jams, the system of the embodiment can prevent an undesired control action that the set vehicle speed is maintained while applying the disk brakes by means of brake control system 8. In such a traffic congestion, the set vehicle speed $V_{SET}$ is set at the predetermined low-speed threshold value $V_1$ higher than a creeping speed of the host vehicle creeping. This reduces a frequency of alterations to the set vehicle speed. On the other hand, when the host vehicle speed Vs is below low-speed threshold value $V_1$ with no preceding vehicle detection, maximum acceleration value $\alpha_{MAX}$ is set to the first set value $\alpha_1$ (a low acceleration limiting value), thus preventing rapid acceleration and insuring smooth comfortable acceleration. After this, as soon as host vehicle speed Vs exceeds low-speed threshold value $V_1$ by increasing set vehicle speed $V_{SET}$, maximum acceleration value $\alpha_{MAX}$ is set to the second set value $\alpha_2$ (a middle acceleration limiting value). Thus, the system of the embodiment allows the host vehicle to accelerate at an adequate acceleration rate. Furthermore, in presence of preceding vehicle detection, regardless of whether the host vehicle speed Vs is high or low, the maximum acceleration value $\alpha_{MAX}$ is set to the third set value $\alpha_3$ (a middle acceleration limiting value). Thus, the system allows the host vehicle to rapidly accelerate at a high acceleration rate in response to the accelerating state of the preceding vehicle.

Figure 7:
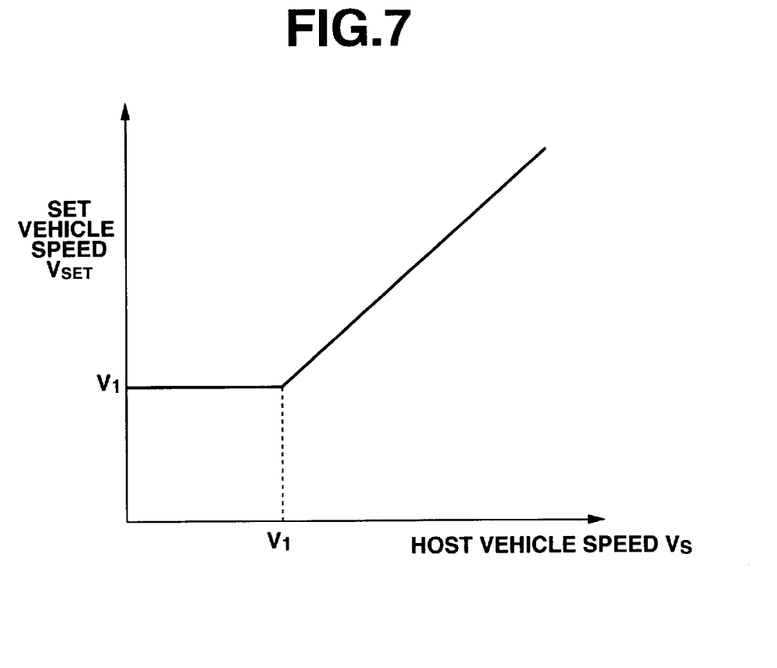
FIG. 7 is a preprogrammed host-vehicle speed (Vs) versus set-vehicle-speed ($V_{SET}$) characteristic map used at the set-vehicle-speed ($V_{SET}$) setting subroutine of FIG. 4.
Figure 8:
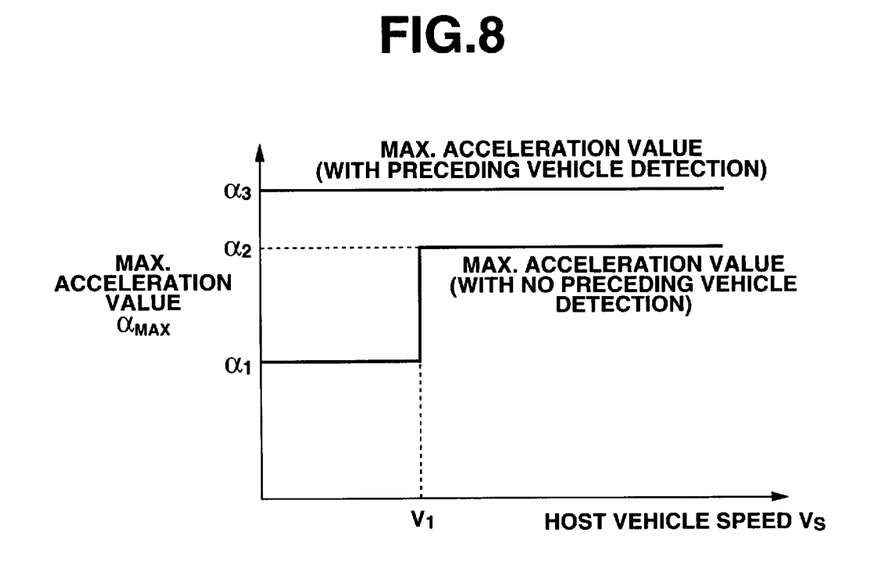
FIG. 8 is a characteristic diagram showing variations in the maximum acceleration value ($\alpha_{MAX}$) as the host vehicle speed (Vs) changes, both in presence of detection of the preceding vehicle (the relevant target vehicle) and in absence of detection of the preceding vehicle.

In the shown embodiment, in setting set vehicle speed $V_{SET}$ at step S23 of FIG. 4, set vehicle speed $V_{SET}$ is actually map-retrieved from the preprogrammed characteristic map shown in FIG. 7. The way to determine set vehicle speed $V_{SET}$ is not limited to such a map-retrieval. Alternatively, a way to set the set vehicle speed $V_{SET}$ may be comprised of (a) determining whether host vehicle speed Vs is below low-speed threshold value $V_1$, (b) setting low-speed threshold value $V_1$ as set vehicle speed $V_{SET}$ when Vs≦$V_1$, and (c) setting host vehicle speed Vs as the set vehicle speed $V_{SET}$ when Vs>$V_1$. Also, low-speed threshold value $V_1$ is preset at a predetermined value greater than the maximum creeping speed occurring owing to a creep phenomenon of the automatic transmission. In lieu thereof, low-speed threshold value $V_1$ may be preset at a speed value higher than a speed at which low threshold road speed $V_1$ can be maintained with no need of a braking force, or at a speed value higher than a speed at which the vehicle can run without any throttle opening (with the throttle valve kept at a minimum throttle opening substantially corresponding to a substantially closed position of the throttle valve) and without any braking force.

In the system of the embodiment, a scanning laser radar is used as the inter-vehicle distance sensor 12 which detects a relevant target vehicle. As a matter of course, other object-detection technologies may be used for relevant target vehicle detection. Instead of the use of the scanning laser radar, a millimeter-wave radar sensor may be used for target vehicle detection. Alternatively, by image-processing image data of a stereocamera using a charge-coupled device (CCD) image sensor, the system is able to determine a host vehicle's distance from the preceding vehicle.

Moreover, in the shown embodiment, a typical automatic transmission 3, which permits a creeping travel of the vehicle without depression of the accelerator in a low vehicle speed range, is mated to the output side of an internal combustion engine 2. The typical automatic transmission 3 may be replaced by a belt-type continuously variable transmission (CVT) or a toroidal CVT. That is, the fundamental concept of the invention can be applied to an automotive vehicle equipped with an engine mated to a CVT. Also, in the shown embodiment, by controlling wheel-brake cylinder pressure of each of disc brakes 7, the system is able to produce a controlled braking force or a controlled braking torque. It will be appreciated that the fundamental concept of the invention can be applied to an electric vehicle or an automotive vehicle employing a parallel hybrid system in which an electric motor generator is used as an actuator of the brake control system instead of the hydraulically-operated disk brakes, and the motor generator can regenerates electricity to the car battery to produce a regenerative braking effect. In this case, the adaptive vehicle speed control system requires an electric motor generator control system instead of the engine output control system 9. In the shown embodiment, although the adaptive vehicle speed control system of the invention is exemplified in a rear-wheel drive vehicle, it will be appreciated that the fundamental concept of the invention can be applied to a four-wheel drive vehicle or to a front-wheel drive vehicle.

The entire contents of Japanese Patent Application No. P11-216689 (filed Jul. 30, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An adaptive vehicle speed control system comprising:
 a vehicle speed detection device which detects a vehicle speed of a host vehicle which is subjected to adaptive vehicle speed control including preceding vehicle following control and vehicle speed control;
 an inter-vehicle distance detection device which detects an inter-vehicle distance between the host vehicle and a preceding vehicle ahead of the host vehicle;
 a set-vehicle-speed setting device having a man-machine interface for setting a set vehicle speed;
 a vehicle speed controller comprising:
  a desired inter-vehicle distance arithmetic-processing section calculating a desired inter-vehicle distance based on at least the host vehicle speed; and
  a following control section determining a desired speed of the host vehicle based on the host vehicle speed and the inter-vehicle distance so that the inter-vehicle distance is brought closer to the desired inter-vehicle distance in presence of detection of the preceding vehicle; and
 a vehicle-speed adjustment device which adjusts the host vehicle speed to the desired speed determined by said vehicle speed controller; and
 an adaptive-vehicle-speed-control initiation command device which outputs a command signal indicative of initiation of the adaptive vehicle speed control including the following control performed through the following control section and the vehicle speed control performed through the vehicle speed control section;
 wherein said vehicle speed controller includes a vehicle speed setting section which sets the desired speed determined by said vehicle speed controller to a speed value higher than a low-speed threshold value, in presence of output of the command signal under a specified condition where the host vehicle speed is below the low-speed threshold value.

2. The adaptive vehicle speed control system as claimed in claim 1, wherein said vehicle speed controller further comprises an acceleration setting section which sets a maximum value of acceleration allowed by both the following control section and the vehicle speed control section at a first set value in presence of output of the command signal under the specified condition where the host vehicle speed is below the low-speed threshold value, and sets the maximum value of acceleration at a second set value higher than the first set value when the set vehicle speed set by the man-machine interface exceeds the low-speed threshold value.

3. The adaptive vehicle speed control system as claimed in claim 2, wherein said acceleration setting section sets the maximum value of acceleration at a third set value higher than the second set value in presence of detection of the preceding vehicle.

4. The adaptive vehicle speed control system as claimed in claim 2, wherein said vehicle speed controller further comprises an acceleration-and-deceleration setting section programmed to perform the following,
   (a) calculating a speed deviation as a difference between the set vehicle speed and the host vehicle speed;
   (b) calculating a first acceleration-and-deceleration value $G^*_V$ used for the vehicle speed control from a first expression $G^*_V=(K_P+K_I/s+K_D \cdot s)Ve$, where s denotes a Laplace variable, $K_P$, $K_I$, and $K_D$ respectively denote a proportional gain, an integral gain, and a derivative gain, and Ve is the speed deviation;
   (c) calculating an inter-vehicle distance deviation as a difference between the inter-vehicle distance detected by said inter-vehicle distance detection device and the desired inter-vehicle distance;
   (d) calculating a relative speed of the preceding vehicle with respect to the host vehicle speed, by differentiating the inter-vehicle distance detected;
   (e) calculating a second acceleration-and-deceleration value $G^*_L$ used for the following control from a second expression $G^*_L=F_1\Delta L+F_2\Delta V$, where $F_1$ and $F_2$ are coefficients, $\Delta L$ denotes the inter-vehicle distance deviation, and $\Delta V$ denotes the relative speed;
   (f) setting the first acceleration-and-deceleration value $G^*_V$ as a desired acceleration-and-deceleration value in absence of detection of the preceding vehicle;
   (g) setting a lower one of the first and second acceleration-and-deceleration values $G^*_V$ and $G^*_L$ as the desired acceleration-and-deceleration value in presence of detection of the preceding vehicle;
   (h) comparing the desired acceleration-and-deceleration value with the maximum value of acceleration; and
   (i) limiting the desired acceleration-and-deceleration value to the maximum value of acceleration only when the desired acceleration-and-deceleration value exceeds the maximum value of acceleration.

5. The adaptive vehicle speed control system as claimed in claim 4, wherein vehicle acceleration and deceleration of the host vehicle are adjusted by engine torque control and brake control depending on the desired acceleration-and-deceleration value during the adaptive vehicle speed control.

6. The adaptive vehicle speed control system as claimed in claim 1, which further comprises an automatic transmission which permits a creeping travel of the host vehicle without depression of an accelerator in a low vehicle speed range, and the low-speed threshold value is set at a speed value higher than a creep speed given during the creeping travel.

7. The adaptive vehicle speed control system as claimed in claim 1, wherein the low-speed threshold value is set at a speed value higher than a speed at which the low-speed threshold value is maintained with no need of a braking force.

8. The adaptive vehicle speed control system as claimed in claim 1, wherein the low-speed threshold value is set at a speed value higher than a speed at which the host vehicle runs without any throttle opening and without any braking force.

9. An adaptive vehicle speed control system comprising:
   a vehicle speed detection means for detecting a vehicle speed of a host vehicle which is subjected to adaptive vehicle speed control including preceding vehicle following control and vehicle speed control;
   an inter-vehicle distance detection means for detecting an inter-vehicle distance between the host vehicle and a preceding vehicle ahead of the host vehicle;
   a set-vehicle-speed setting means having a man-machine interface for setting a set vehicle speed;
   a vehicle speed controller comprising:
      a desired inter-vehicle distance arithmetic-processing means for calculating a desired inter-vehicle distance based on at least the host vehicle speed; and
      a following control means for determining a desired speed of the host vehicle based on the host vehicle speed and the inter-vehicle distance so that the inter-vehicle distance is brought closer to the desired inter-vehicle distance in presence of detection of the preceding vehicle; and
   a vehicle-speed adjustment means for adjusting the host vehicle speed to the desired speed determined by said vehicle speed controller; and
   an adaptive-vehicle-speed-control initiation command means for outputting a command signal indicative of initiation of the adaptive vehicle speed control including the following control performed through the following control means and the vehicle speed control performed through the vehicle speed control means;
   wherein said vehicle speed controller includes a vehicle speed setting means for setting the desired speed determined by said vehicle speed controller to a speed value higher than a low-speed threshold value, in presence of output of the command signal under a specified condition where the host vehicle speed is below the low-speed threshold value.

10. An adaptive vehicle speed control method, which comprises:
   detecting a vehicle speed of a host vehicle which is subjected to adaptive vehicle speed control including preceding vehicle following control and vehicle speed control;
   detecting an inter-vehicle distance between the host vehicle and a preceding vehicle ahead of the host vehicle;
   setting a set vehicle speed through a man-machine interface;
   calculating a desired inter-vehicle distance based on at least the host vehicle speed;
   determining a desired speed of the host vehicle based on the host vehicle speed and the inter-vehicle distance so that the inter-vehicle distance is brought closer to the desired inter-vehicle distance in presence of detection of the preceding vehicle;

adjusting the host vehicle speed to the desired speed;

outputting a command signal indicative of initiation of the adaptive vehicle speed control including the following control and the vehicle speed control; and setting the desired speed to a speed value higher than a low-speed threshold value, in presence of output of the command signal under a specified condition where the host vehicle speed is below the low-speed threshold value.

* * * * *